UNITED STATES PATENT OFFICE.

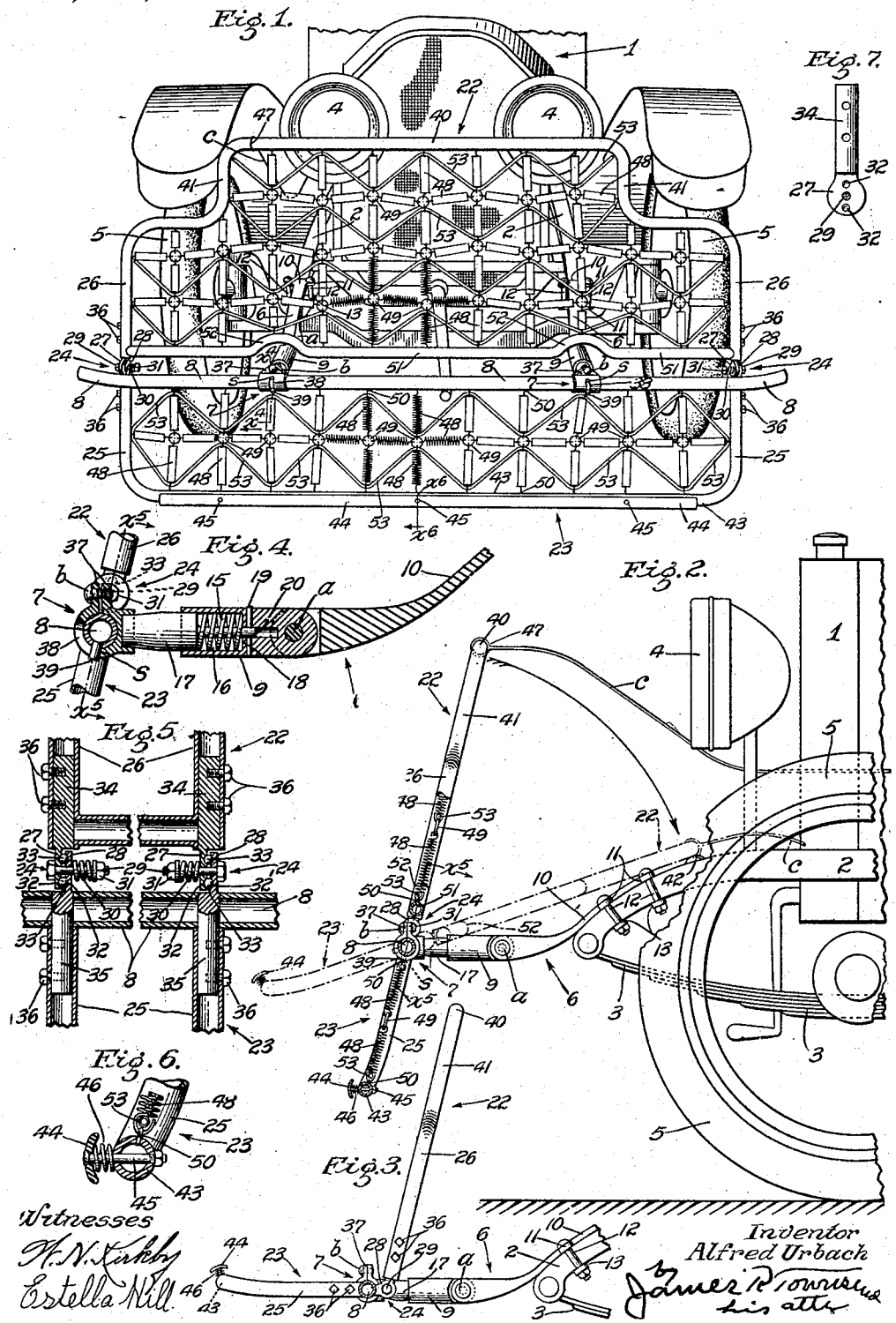

ALFRED URBACH, OF LOS ANGELES, CALIFORNIA.

MOTOR-CAR FENDER.

1,202,249.  Specification of Letters Patent.  Patented Oct. 24, 1916.

Application filed April 3, 1915. Serial No. 19,058.

*To all whom it may concern:*

Be it known that I, ALFRED URBACH, a citizen of the United States, residing at Los Angeles, in the county of Los Angeles and State of California, have invented a new and useful Motor-Car Fender, of which the following is a specification.

The general object of this invention is to provide a fender for motor cars which shall be gainly in appearance, strong and simple in construction and perfectly satisfactory in preventing danger to life or limb, and more particularly to provide a fender which is yieldingly supported to thus minimize liability of breakage and to more effectively resist shocks.

An objectionable feature in fenders of this character is the usual horizontal member positioned in close proximity to the ground which upon contacting with a person knocks the feet out from under and trips said person into the fender, and a specific object of this invention is to avoid this horizontal member by providing a substantially upright fender into which a person when struck will fall instead of being tripped, said upright fender tilting in front of the engine hood to catch the fallen person.

Another object is to provide a fender comprising two sections which are normally held in alinement with one another when in normal upright position upon the motor car, but which sections may be moved out of alinement relative to one another when occasion requires, as in the case of traveling over rough country, when it becomes desirable to turn the lower section up in order to clear the road undulations, or in the case of cranking a car when it becomes desirable to temporarily turn the upper section down to gain access to the crank.

Another object is to provide a compactly arranged fender which projects a minimum distance beyond the front of the car.

Other objects and advantages may appear from the subjoined detailed description.

Figure 1 is a perspective view illustrating the application of a fender embodying this invention as attached to the forward portion of a motor car. The resilient net-work is shown partly diagrammatic. Fig. 2 is a fragmental side elevation from the right of Fig. 1, the fender frame being partly in section. Solid lines show the fender in normal upright position and dot and dash lines indicate the catching position to which the fender tilts. Fig. 3 is a fragmental view analogous to Fig. 2 illustrating the lower fender section turned upwardly relative to the upper fender section to afford greater clearance space in traveling over rough country roads. Fig. 4 is an enlarged fragmental section through one of the fender supports on the line indicated by $x^4$—$x^4$, Fig. 1, parts being in the normal upright position corresponding to Fig. 1. Fig. 5 is a fragmental section on the line $x^5$—$x^5$, Figs. 2 and 4, illustrating the hinge construction for the fender sections. Parts are broken away to contract the view. Fig. 6 is an enlarged cross section on the line $x^6$—$x^6$, Fig. 1. Fig. 7 is a view of one of the hinge knuckles detached.

In the drawings, the motor car hood 1, side members 2 of the supporting frame, springs 3, lamps 4 and forward wheels 5, are all of the usual construction, the supporting frame being provided with two forwardly extending fender brackets 6, that are adapted to yieldingly support a fender in front of the motor car. Said brackets are rigidly attached to the front portion of said frame and terminate in bearings 7 which pivotally carry the transverse cross-bar 8 of the fender frame to tiltingly support the fender, and each bracket preferably comprises a cushioning portion 9 detachably connected to a rear frame extension 10 by suitable means, such as a bolt $a$, that tightly clamps the two together, said connection $a$ permitting the fender together with the cushioning bracket portion 9 to be quickly dismantled in case it is desired to temporarily remove the fender.

Each of the bracket extensions 10 substantially conforms to the rounding front of the side members and are provided with eyes 11 adapted to receive clamp bolts 12 that pass through lower cross-pieces 13 arranged on the under side of each side member, the bolts securely and rigidly clamping the brackets 6 to the supporting frame and permitting forward and backward bracket adjustment on said frame.

The bearings 7 are each backed by the cushioning bracket portion 9 which consists of a spring 15 mounted in a seat 16, said spring being interposed between the bearing plunger member 17 and the end wall 18 of the seat, the plunger member being held in position in the usual manner by means of a bracket cotter pin 19 extending through the slotted plunger extension 20.

The fender preferably comprises upper and lower sections 22 and 23, respectively, connected to each other by tension hinges 24 that are adapted to normally hold said sections in alinement one with the other.

The transverse cross-bar 8 is mounted to frictionally turn in the bearings 7, the axis of said cross-bar constituting the pivotal axis about which the fender turns, and side bars 25 of the lower fender section are rigidly connected to said cross-bar, thus mounting said lower section to turn about the pivotal fender axis. Side bars 26 of the upper fender section are hingedly connected to the cross-bar and lower section by the tension hinges 24 at each side of the fender. Each of said hinges 24 comprises an upper section knuckle 27 and a lower section knuckle 28 which pair of knuckles are hinged together by a bolt 29, having upon its projecting end a tension spring 30 that is interposed between the adjacent knuckle and a nut 31, said nut serving to adjust the compression of the spring and thus regulate the hinge tension as desired.

The hinge bolts 29 are preferably arranged to mount the springs 30 inwardly of each hinge and the side knuckles 27 of the upper fender section are positioned one upon the inside and one upon the outside of the knuckles 28 of the lower fender section so as to permit of a slight sidewise movement of said upper section relative to said lower section which movement occurs whenever the sections are manually turned out of alinement as now to be described. Each knuckle 27, 28 of each pair is provided with diametrically opposite sockets 32, 32' respectively, the sockets 32 of one being in register with the sockets 32' of the other when the upper and lower sections are alined together (see Figs. 5 and 7) and two antifriction balls 33 are positioned between the knuckles 27, 28 and are adapted to ride into the sockets 32, 32' as the sections are brought into alinement with one another, the spring 30 yieldingly locking said sockets in position over the balls with the upper and lower sections alined together. When force is applied to relatively turn said sections, the balls 33 of each hinge ride out of the sockets and around between the inner knuckle faces, slightly moving the knuckles 27 toward the left in Figs. 1 and 5 against the force of the springs 30 and slightly shifting the upper section sidewise relative to the lower section, the spring 30 acting to yieldingly lock the sections together again as they are brought into alinement.

The knuckles 27, 28 are preferably formed on shanks 34, 35 respectively that are inserted in the hollow extremities of the frame bars 26, 25 and secured therein by studs 36, the shanks 35 passing through the cross-bar 8 to thus rigidly secure said cross-bar and lower frame together.

The bearings 7 are preferably constructed in the form of clamps to frictionally carry the fender cross-bar 8, said clamps having clamping lips 37 and clamp screw $b$ by means of which the frictional resistance between the clamps and cross-bar may be regulated, said frictional resistance being just sufficient to frictionally hold the fender in any predetermined position.

The tilting fender in its normal operative position is preferably inclined slightly from the vertical in an upward and rearward direction, the upper section being adapted to tilt rearwardly and down from this position as the lower section tilts forwardly and up, and stop means to prevent the lower fender section from tilting rearwardly beyond the vertical are provided to thereby avoid all chance of a person rolling beneath the fender and under the wheels of the car. Said stop means preferably comprise circumferential slots 38 in the bearings and stop pins 39 on the cross-bar, said pins being adapted to extend into the slots and abut against the stop ends $s$ thereof to limit the rearward tilting movement of the lower fender section.

The side bars 26 of the upper fender section connect with the top bar 40 and said side bars have their top portions inwardly offset as at 41 in order that the fender may clear the front wheels 5 when the upper section is tilted down in front of the engine hood 1. Resilient bumpers 42 are provided upon the side frame members 2, adapted to contact with the top bar 40 when said upper section is tilted down, to cushion the fender and also to act as fender stops.

The side bars 25 of the lower fender section connect with the bottom bar 43 which is provided with a cushion strip 44 yieldingly supported in front thereof by means of suitably positioned sliding bolt connections 45, each having a spring 46 that is interposed between the bar 43 and cushion strip 44, the purpose of this cushion strip being to ease the impact as a person is struck by the bottom bar upon falling into the fender.

An operating connection $c$ in the form of a rod suitably attached to the fender as at 47 may extend back to the driver's seat (not shown) by means of which connection the driver may operate the fender about its pivotal axis to throw it into commission, as shown by solid lines in Fig. 2, or out of commission, as indicated by the dot and dash lines in Fig. 2.

Any appropriate resilient net-work may be utilized for the fender sections, being preferably of an open nature so as not to interfere with the light rays from the lamps 4, said net-work in the instance shown comprising a series of transversely and longitudinally arranged helical springs 48 interconnected by disk connections 49.

In the lower section the springs 48 are attached to the side bars 25, bottom bar 43 and cross-bar 8 by suitable eye connections 50, and in the upper section the springs are attached to the side bars 26, top bar 40 and a transverse bar 51 having offsets 52 in alinement with the brackets 6 for the purpose of clearing the same when the fender is tilted to catching position. Interwoven in this arrangement of helical springs 48 are the smaller diagonal helicals 53 preferably passing through the eye extremities of said helical springs 48.

The construction and arrangement of the fender is such that upon striking an upright person the impact occurs above the pivotal fender axis and tilts the top of said fender rearwardly and downwardly in front of the engine hood to catch the person while the bottom tilts outwardly and forwardly to prevent the caught person from sliding forward and out of the fender.

The brackets 6 support the fender in front of the car a distance just sufficient to allow the top bar 40 to clear the lamps 4 as the fender moves down to the catching position indicated by dot and dash lines in Fig. 2, which leaves the space intermediate the front of the hood 1 and the tilted fender too restricted to permit a person dropping through and beneath the car.

The bottom bar of the fender is positioned preferably about 8" above the ground, this being sufficiently high to clear comparatively level roads and pavements and yet sufficiently low to strike the person without breaking the lower limbs and to prevent the person from rolling beneath the fender and under the car. However, in case of traveling over rough country roads where the fender clearance space is required to be much greater and the practical need of a fender much less, the lower section may be turned up relative to the upper section as shown in Fig. 3, the fender then being in commission in the form of the sloping upward section and a horizontal lower section.

When the fender is in normal upright position the stop pins 39 are in engagement with the ends s of the bearing slots 38, so that when sufficient force is used to pull the top section forwardly from this position the stop pins will prevent the lower section from turning, with the result that the upper hinge knuckles 27 will turn relative to the lower hinge knuckles 28 and thus allow the top section to turn independently of the lower section. Said top section may thus be swung forwardly and downwardly and out of the way when it is desired to crank the car and thereby afford ready access to the crank.

I claim:

1. The combination with the frame of a motor car, of brackets attached to the front portion of said frame and terminating in supporting clamps, a cross-bar frictionally carried in said clamps and a tilting fender carried by said cross-bar, the frictional resistance between the clamps and said cross-bar being adapted to maintain the fender in a substantially normal upright position and means to regulate the frictional resistance between the clamps and the cross-bar.

2. The combination with the frame of a motor car, of brackets attached to the front portion of said frame, a cross-bar pivotally carried by said brackets and frictionally supported therein, a fender connected to said cross-bar and comprising upper and lower sections, said lower section being rigidly connected with the cross-bar to turn therewith and said upper section being hinged to the cross-bar and adapted to turn relative to said lower section, and means to normally maintain said upper section in alinement with said lower section.

3. The combination with a motor car frame, of brackets attached to the frame and terminating in supporting bearings, a tilting fender having a transverse supporting bar adapted to be carried by said bearings, said bearings being provided with circumferential slots, and stop pins on the supporting bar adapted to extend into said slots and abut against the ends thereof to limit the rearward tilting movement of the lower part of said fender.

4. The combination with a motor car frame, of brackets attached to the frame and terminating in supporting bearings, a tilting fender having a transverse supporting bar adapted to be carried by said bearings, said bearings being provided with stops, and pins on the supporting bar adapted to abut against said stops to stop the fender in normal upright position, and resilient bumpers upon the frame to stop the fender in catching position.

5. The combination with a motor car frame, of brackets attached to the frame and terminating in supporting bearings, a tilting fender carried by said bearings comprising upper and lower hinged sections yieldingly locked in alinement with one another, said alined sections being slightly inclined from the vertical in an upward and rearward direction when in normal operative position and being adapted to be manually turned independently of each other, the bearings being provided with stops, and pins on the lower section adapted to abut against said bearing stops to thereby prevent said lower section from tilting rearwardly beyond the vertical.

6. The combination with a motor car frame, of brackets attached to said frame; a lower fender section carried by said brackets and having side knuckles; an upper fender section having side knuckles; means to hingedly connect the knuckles in pairs at each side of the sections; diametrically opposite sockets arranged in the inner side of each knuckle, the sockets of each pair of knuckles being adapted to register with one another when said upper and lower sections are alined together; balls positioned between the knuckles and adapted to ride into said sockets, and spring means to yieldingly lock the registering sockets in place over said balls to thereby normally lock the upper and lower sections together.

In testimony whereof, I have hereunto set my hand at Los Angeles, California, this 29th day of March, 1915.

ALFRED URBACH.

In presence of—
JAMES R. TOWNSEND,
WILLIAM N. KIRKBY.

Copies of this patent may be obtained for five cents each, by addressing the "Commissioner of Patents, Washington, D. C."